April 24, 1951  C. H. FAY  2,550,052
VISCOSITY METER

Filed Feb. 21, 1949  2 Sheets-Sheet 1

Inventor: Charles H. Fay
By: His Attorney

April 24, 1951 C. H. FAY 2,550,052
VISCOSITY METER
Filed Feb. 21, 1949 2 Sheets-Sheet 2

Inventor: Charles H. Fay
By: His Attorney

Patented Apr. 24, 1951

2,550,052

UNITED STATES PATENT OFFICE 2,550,052

VISCOSITY METER

Charles H. Fay, Houston, Tex., assignor to Shell Development Company, San Francisco, Calif., a corporation of Delaware Application February 21, 1949, Serial No. 77,557

6 Claims. (Cl. 73—59)

This invention pertains to viscosity meters, and relates particularly to apparatus for electrically measuring the viscosity of fluids held in pressure vessels or otherwise not directly accessible for handling by the operator.

The operation of conventional viscosimeters normally involves the measurement of the flow of a fluid through a calibrated orifice, as in the Saybolt viscosimeter, or of the frictional resistance of a fluid to the rotation of body immersed therein, as in the Stormer viscosimeter. Viscosimeters of the rolling ball type are also in common use. Measurements by means of these devices are however possible only when the fluid itself and all essential parts of the measuring apparatus are accessible to the operator for manipulation and adjustment.

In some cases, however, for example, in measurements connected with the study of mineral oil reservoirs, it is necessary to measure the viscosity of a petroleum fluid under the exact equilibrium conditions of pressure, temperature, gas saturation, etc., which exist in the reservoir or at the bottom of a well. Thus, a viscosimeter must be actually lowered to the bottom of a well, or samples of the well fluid must be brought to the surface in pressure bombs for proper measurements.

It has been proposed to use in such case a viscosimeter comprising a magnet and a coil adapted to be immersed in a fluid and mounted for relative oscillation with regard to each other, said oscillation being initiated by an electric discharge through the coil, and the rate of damping of the oscillation by the fluid being a measure of the viscosity of the fluid.

It is therefore an object of this invention to provide apparatus for electrically measuring the viscosity of fluids held in sealed containers under predetermined pressure and temperature conditions.

It is also an object of this invention to provide a system for viscosity measurements whereby the measured values are immediately indicated to the operator by electrical meters, and no time delay is incurred through the necessity of photographically producing and interpreting oscillograph records.

It is also an object of this invention to provide a system for viscosity measurements wherein a cylindrical magnet immersed in a fluid is maintained in stable oscillation at a constant amplitude by the interaction of its field with the oscillating field of a coil mounted adjacent thereto, a function of the power input to said coil being a measure of the damping due to the viscosity of the fluid in which said magnet is oscillating.

It is also an object of this invention to provide a system of the above type wherein voltages induced by the oscillation of the magnet's field in a detector coil are amplified by an amplifier system and applied to a driver coil to maintain said magnet in a condition of stable oscillation at a constant amplitude.

It is also an object of this invention to provide a system of the above type wherein the amplification necessary for maintaining said magnet in oscillation is measured by measuring the negative feedback factor controlling said amplification.

These and other objects of the invention will be understood from the following description taken with reference to the attached drawings wherein.

Figure 1:
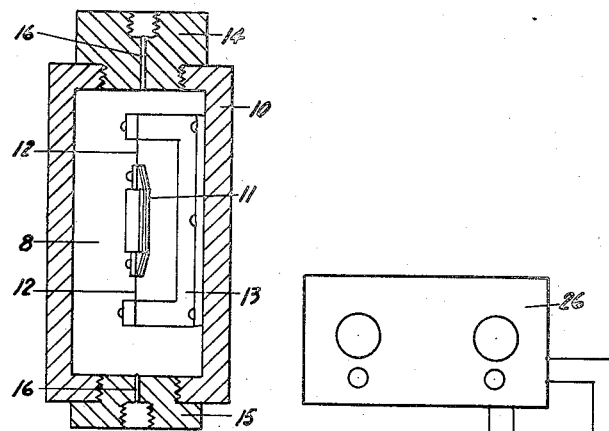
Fig. 1 is a vertical cross-section view of the fluid chamber of the present apparatus.
Figure 2:
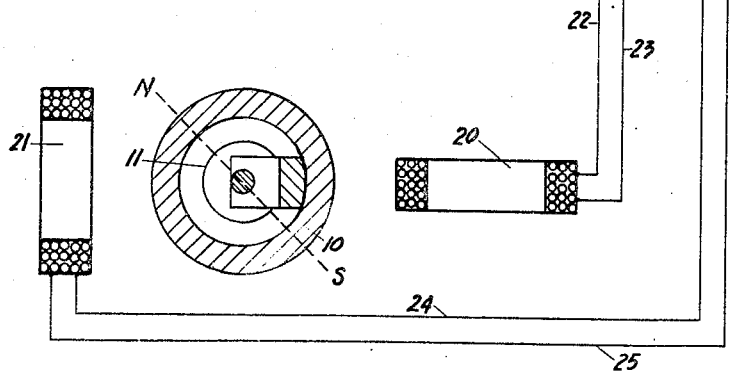
Fig. 2 is a horizontal cross-section view of said chamber, showing also the driver and the detector coils of the present apparatus.

Referring to Fig. 1, a cylindrical housing or vessel 10, forming a fluid-tight chamber 8 capable of withstanding high pressures, has suspended therein a magnet element 11, which is preferably of cylindrical shape, having an axial length of approximately from one to four inches and a diameter of from ¼ to ¾ inch. The magnet is made of a metallic alloy of high coercive strength and retentivity such as an alloy of steel, copper, nickel and cobalt, for example, an alloy technically known as cunico. This permits the cylinder 11 to be magnetized so as to have its north and south poles located in diametrically opposite segments of the cylinder, as indicated in Figs. 1 and 2, rather than at the axially opposite ends of the cylinder, as in conventional magnets. Spring, filament or wire elements 12, extending substantially along the vertical axis of magnet 11 and having desired resiliency characteristics, mount the magnet 11 on bracket or other support means 13 as a torsion pendulum for oscillation about its vertical axis, the bracket 13 being firmly attached to the housing 10.

Any desired stirring means for the fluid, such as a magnetic stirrer, may be used in chamber 8. These means, forming no part of this invention, are not shown in Fig. 1.

The housing 10 is provided with top and bottom openings closed by screw-threaded plugs 14 and 15, having channel means 16 therethrough, whereby the housing 10 may be filled with any desired fluid, for example, by transferring to the chamber 8 the contents of a pressure bomb by means of a mercury displacement pump, without changing the pressure conditions involved, as well understood in the art. The housing 10 may then be hermetically sealed by providing any suitable closures or plugs, not shown, for the channels 16.

The housing 10 is preferably mounted in a suitable thermostat-controlled temperature zone, so as to maintain the fluid in chamber 8 at any desired temperature. Such temperature-control installation, being well known in the art, and forming no part of this invention, is not shown in Figs. 1 and 2. Disposed adjacent the housing 10 are coils 20 and 21, connected, through conductors 22 and 23, and conductors 24 and 25, respectively, to a compartment 26, holding the electrical circuits of the present invention, shown in detail in Fig. 3.

The axes of coils 20 and 21 are disposed in a horizontal plane passing approximately through the mid-point of the vertical axis of magnet 11 perpendicularly to said axis. The axis of coil 21, which intersects with the vertical axis of magnet 11, is furthermore perpendicular in said horizontal plane to the axis of coil 20, which does not intersect with the vertical axis of magnet 11. This arrangement of coils 20 and 21 substantially eliminates direct magnetic coupling therebetween. For maximum transfer of energy, the north-south axis of the magnet is adjusted to extend at rest along a line at 45° to the axes of coils 20 and 21, as indicated by the dotted line N—S in the drawing.

The coil 21 acts as a driver coil for the magnet, being energized by alternating current from leads 24 and 25 to produce a magnetic field which interacts with the field of the magnet 11 and thus causes the magnet to oscillate about its vertical axis. The oscillation of the magnet 11 and of the magnetic field associated therewith causes oscillating currents to be induced in coil 20, which acts as a pick-up or detector coil, said currents being transmitted through conductors 22 and 23 to the electrical units or circuits within compartment 26.

Figure 3:
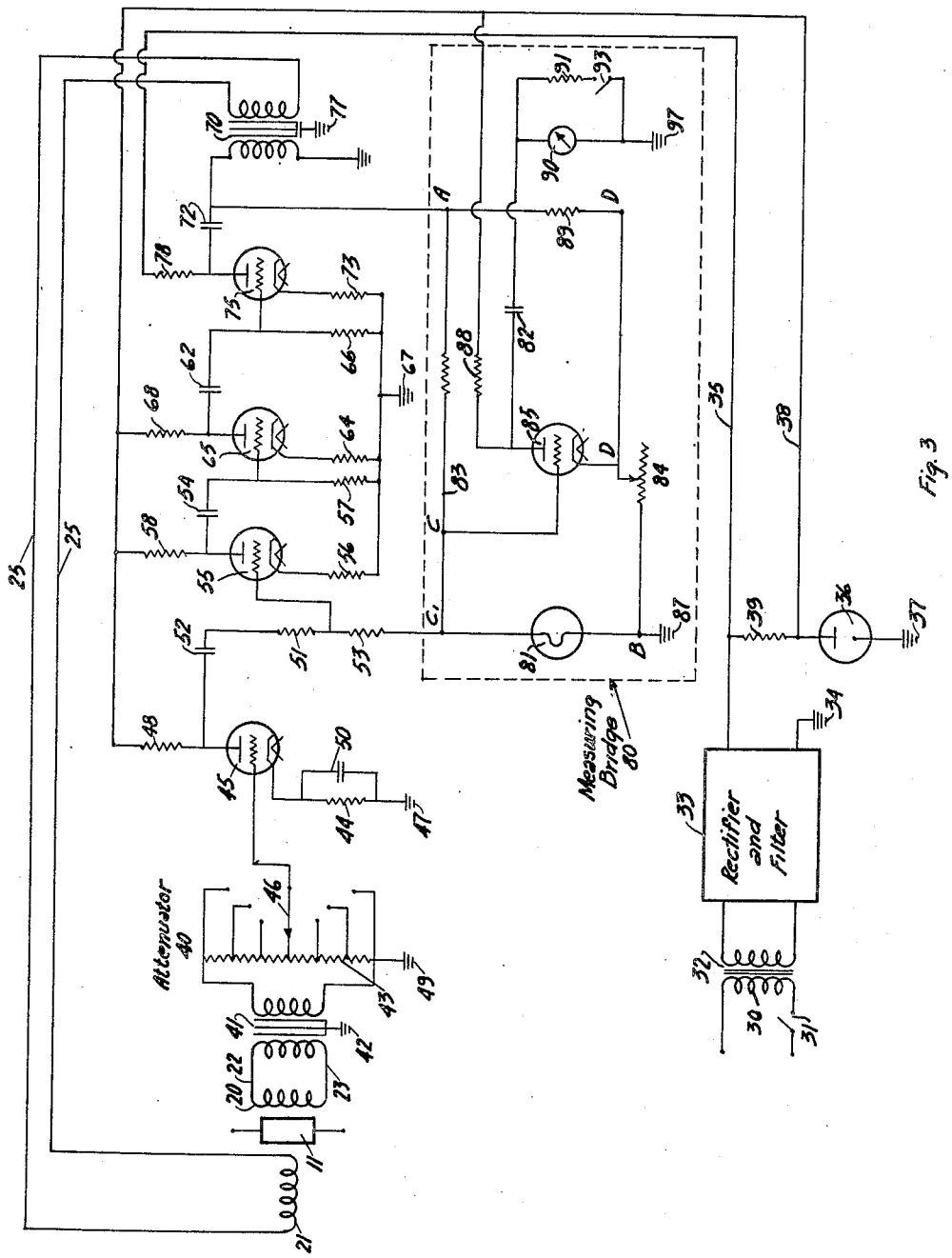
Fig. 3 is a circuit diagram of the system of the present invention.

These units or circuits, as shown in Fig. 3, comprise a stepwise attenuator 40, calibrated, for example, in one decibel steps, connected to the coil 20 through a transformer 41 having its core grounded at 42. A tapped grounded resistance 43 is connected across the secondary of the transformer 41, whereby a chosen known fraction of the voltage developed across said resistance can be applied to the grid of a thermionic amplifier 45 by means of a selector switch 46. Conventional cathode bias means comprise a resistance 44 and bypass condenser 50.

The plate of tube 45 is coupled through condenser 52 and resistance 51 to the grid of the next thermionic amplifier 55, which is also coupled through resistance 53 to a feedback network comprising resistance 83 and lamp 81, to be described hereinbelow.

The single stage amplifier employing tube 45 is shown for simplicity, it being understood that a multi-stage amplifier stabilized by negative feedback may be employed.

The plate of tube 55 is coupled through condenser 54 to the grid of a thermionic amplifier 65, whose plate is in turn coupled through a condenser 62 to the grid of a further thermionic amplifier 75. The plate of tube 75 is coupled through a condenser 72 to the primary of a transformer 70, having its core grounded at 77. The secondary of the transformer 70 is connected by leads 24 and 25 to the driver coil 21. The grids and the cathodes of tubes 55, 65, and 75 are returned to ground at 67 through resistances 56, 57, 64, 66 and 73 of suitable selected values. It is understood that bypass condensers may be employed across one or more of resistances 56, 64 and 73.

The operating power for the circuits or units described above is provided from any suitable A. C. line supply 30. The closing of a switch 31 energizes, through a transformer 32, a rectifier and filter unit 33. One of the D. C. output terminals of unit 33 is grounded at 34, and the other is connected to a lead 35, providing the desired plate voltage, such for example, as 240 volts, for the tube 75, to which said voltage is applied through a suitable resistance 78.

A resistance 39, connecting the lead 35 to the ground at 37 through a constant voltage regulator 36, serves to provide, through a lead 38, the operating plate voltage, for example, 150 volts for the tubes 45, 55 and 65, to which it is applied through suitable resistances 48, 58 and 68. Condensers 52, 54, 62 and 72 are provided in the plate circuits of tubes 45, 55 and 65 to separate the A. C. and the D. C. components of their plate voltages.

A measuring bridge 80 has its four arms formed, respectively, of a resistance 83, resistance 89, adjustable resistance 84 and non-linear resistance 81, such as a lamp having a tungsten filament whose value may vary, for example, from about 400 ohms when said filament is cold, to about 500–600 ohms when said filament is heated with a few milliwatts, the lamp having a rating such as 3 watts, 120 volts.

The bridge is energized across its apex points A and B by current passing from the plate of tube 75 to the ground 87, while the potential across the bridge is measured between points C and D, said potential being of course zero when the bridge is balanced in the usual sense.

Although the bridge is connected to the amplifier circuits also at a point $C_1$, which is at the same potential as point C, this has substantially no effect on the balance of the bridge, as the value of any extraneous current at $C_1$ is extremely small due to the high values of the resistances 51 and 53, such as half a megohm each, and any small unbalance due to such currents may be corrected by an adjustment of the variable resistance 84.

Instead of a measuring device being connected directly across points C and D, said points are connected, respectively, to the grid and cathode of a thermionic tube 85, whose plate voltage is supplied from lead 38 through resistance 88. The A. C. plate output of tube 85 is delivered to an indicating device 90, grounded at 97, such for example as an A. C. microammeter. It can be shown that even though the condition for no output differs slightly from the usual bridge balance condition this, however, has no adverse effect. On the other hand, this arrangement has the advantage that no current is drawn from the feedback network by the measuring system when the bridge is unbalanced.

It is understood that although the diagram of Fig. 3 shows, for simplicity, all thermionic tubes as triodes, thermionic tubes of other suitable types, such as pentode or multi-electrode tubes may equally well be used. Thus, for example, tubes 45, 55, 65 and/or 85 can advantageously be high-mu, twin triode tubes of the type designated at 7F7. It is also understood that each of the individual tubes shown in Fig. 3 may be replaced by two or more tubes suitably connected in parallel, in cascade, or in any other suitable arrangement, as is well understood in the art. Thus, instead of tube 75, two triodes of a type designated as 6J5 may be effectively connected in parallel in the circuit of Fig. 3. It is further understood that only the essential elements necessary to make the present circuits operative have been shown in Fig. 3, which omits for clearness all conventional details, such as heater circuits, or various resistance and condenser elements, which may be desirable for a more efficient and stable operation of the system, as will be well understood by those versed in electronics.

The theory and operation of the present apparatus are as follows:

The damping of the oscillating magnet 11 is essentially of four types, namely, mechanical, electrical, magnetic and viscous damping. A correction term to eliminate the effects of all but the viscous type of damping may be obtained from a reading of the viscosimeter in vacuum or, for all practical purposes, in air.

When the circuits shown in Fig. 3 are energized by closing the switch 31, the magnet 11 starts to oscillate at its natural frequency such as about 50 cycles per second, the start of oscillation being due to random or statistical causes, in the manner generally common to oscillators. The oscillation of the magnet 11 induces in the coil 20 an alternating voltage, which is applied, by means of transformer 41, across the attenuator resistance 43. A certain fraction of this voltage, determined by the setting of the selector switch 46, is applied to the grid of tube 45 as the input voltage of the amplifier stages. This voltage, after suitable amplification in the stages comprising tubes 45, 55, 65 and 75, is delivered to the transformer 70 and is applied, as the output of the amplifier system, to the driver coil 21 to maintain the magnet 11 in oscillation.

If the overall gain of the amplifier is sufficient, the amplitude of oscillation will build up until limited by reduction of amplifier gain due either to amplifier overload or to the increase in negative feedback produced by the heating and consequent increase in resistance of lamp 81. It is necessary to adjust selector switch 46 until the oscillation is stabilized by the latter phenomenon only, as is evidenced by the possibility of balancing measuring bridge 80, two of whose arms are the feedback network comprising resistance 83 and lamp 81, the other two being resistance 89 and adjustable resistance 84, within the design range of adjustment of said resistance. The value of said resistance at balance is a measure of the resistance of lamp 81, and hence, as will be readily understood by those familiar with feedback amplifier theory, of the gain of the amplifier around which the feedback takes place, namely, the three-stage amplifier employing, tubes 55, 65, and 75. Adjustable resistance 84 may conveniently cover the gain interval between steps of selector switch 46, for example, one decibel, and be calibrated in suitable fractions of that interval. The total amplifier gain in decibels relative to an arbitrary zero decibel level can then be obtained by adding the readings of selector switch 46 and adjustable resistance 84, after adjusting the latter until the bridge is balanced. This total gain is a measure of the damping effect and therefore of the viscosity (or, more strictly, of the product of viscosity and density, over the range of this product for which the instrument is designed) of the fluid in which the magnet 11 is immersed.

In calibrating the present apparatus, a chart is first prepared by immersing the magnet 11 in liquids of known viscosity and density, such as glycerine solutions, mineral oils whose viscosities had been determined by other methods, etc., and plotting said viscosities against the attenuation readings as given in decibels by the setting of the resistance 43, and in fractional decibels by the setting of the resistance 84. For example, after the magnet 11 has been immersed in a desired fluid of known viscosity, the switch 31 is closed, and the system is set in oscillation by proper manipulation of the selector switch 46, switch 93 remaining closed to protect the microammeter against excessive currents. After switch 46 has been adjusted so as to bring the reading of the microammeter substantially to zero, the switch 93 is opened, and the measuring bridge 80 is re-balanced by adjusting the resistance 84 so as to bring the microammeter 90 again back to zero. This procedure, repeated for different fluids of known viscosity, gives a series of points through which a calibration curve may be drawn, showing the relationship between viscosity, expressed, for example, in centipoises, and the readings of the present apparatus in decibels and fractions thereof, as given by the settings of resistances 43 and 84, respectively. The viscosity of an unknown fluid can then be determined by immersing the magnet 11 therein, repeating the measuring procedure described above, and referring the readings obtained to the calibration curve.

I claim as my invention:

1. An apparatus for measuring the viscosity of a fluid, comprising a chamber adapted to receive said fluid, a magnet, torsion means mounting said magnet for oscillation in said chamber, a driver coil and a detector coil positioned adjacent said chamber, an amplifier circuit, means coupling the input of said amplifier circuit to said detector coil, means coupling the output of said amplifier circuit to said driver coil, whereby the voltages induced in said detector coil by the oscillation of said magnet are applied with amplification by said circuit to the driver coil to mantain said magnet in oscillaton, and measuring circuit means connected to said amplifier circuit for measuring an amplification value necessary for maintaining said magnet in oscillation at a constant amplitude in said fluid.

2. An apparatus for measuring the viscosity of a fluid, comprising a chamber adapted to receive said fluid, a magnet, torsion means mounting said magnet for oscillation in said chamber, a driver coil and a detector coil positioned adjacent said chamber, an amplifier circuit, means coupling the input of said amplifier crcuit to said detector coil, means coupling the output of said amplifier circuit to said driver coil, whereby the voltages induced in said detector coil by the oscillation of said magnet are applied with amplification by said circuit to the driver coil to maintain said magnet in oscillation, negative feedback means connected to said amplifier circuit to control the amplification gain thereof, and measuring means in circuit with said negative feedback means for measuring the value of the negative feedback factor required to provide an amplification gain necessary for maintaining said magnet in oscillation at a constant amplitude in said fluid.

3. An apparatus for measuring the viscosity of a fluid, comprising a chamber adapted to receive said fluid, a cylindrical magnet having its north and south poles located in diametrically opposite segments thereof, torsion means mounting said cylindrical magnet in said chamber for oscillation about its axis disposed along a vertical line, a driver coil and a detector coil positioned adjacent said chamber, the axes of said coils extending at right angles to each other in a horizontal plane intersecting said cylindrical magnet intermediate the ends thereof, whereby substantially no direct magnetic linkage is established between said coils, an amplifier circuit, means coupling the input of said amplifier circuit to said detector coil, means coupling the output of said amplifier circut to said driver coil, whereby the voltages induced in said detector coil by the oscillation of said magnet are applied with amplification by said circuit to the driver coil to maintain said magnet in oscillation, and measuring circuit means connected to said amplifier circuit for measuring an amplification value necessary for maintaining said magnet in oscillation at a constant amplitude in said fluid.

4. An apparatus for measuring the viscosity of a fluid, comprising a chamber adapted to receive said fluid, a cylindrical magnet, torsion means mounting said cylindrical magnet for oscillation in said chamber about its axis disposed along a vertical line, a driver and a detector coil positioned adjacent said chamber, the axes of said coils being at right angles to each other, an amplifier system, means coupling the input of said amplifier system to said detector coil, means coupling the output of said amplifier system to said driver coil, whereby the voltages induced in said detector coil are applied with amplification by said system to the driver coil to maintain said magnet in oscillation, negative feedback means in circuit with said amplifier system to control the amplification gain thereof, and measuring means in circuit with said negative feedback means for measuring the value of the negative feedback factor required to provide an amplification gain necessary for maintaining said magnet in oscillation in said fluid.

5. The apparatus of claim 3, wherein the measuring means comprise a measuring bridge circuit connected to the negative feedback circuit means, said bridge having a non-linear resistance element connected into one of the arms thereof, whereby a change in the value of the negative feedback current causes a change in the balance condition of the bridge.

6. The apparatus of claim 4, comprising a thermionic tube, a current measuring device connected to the output of said tube, the cathode and the grid of said tube being connected respectively to the two points on said bridge between which the potential across said bridge is measured, whereby substantially no current is passed between said two points upon a change in the balance of said bridge.

CHARLES H. FAY.

REFERENCES CITED

The following references are of record in the file of this patent:

UNITED STATES PATENTS

| Number | Name | Date |
| --- | --- | --- |
| 2,142,854 | La Pierre | Jan. 3, 1939 |
| 2,178,252 | Forster | Oct. 31, 1939 |
| 2,283,750 | Mikelson | May 10, 1942 |
| 2,302,895 | Root | Nov. 24, 1942 |
| 2,326,033 | Hutcheson | Aug. 3, 1943 |
| 2,340,507 | Bjork | Feb. 1, 1944 |
| 2,340,992 | Siegel | Feb. 8, 1944 |
| 2,358,374 | Ashcraft | Sept. 19, 1944 |
| 2,361,396 | Gross | Oct. 31, 1944 |